US012773841B2

(12) United States Patent
Sadakane

(10) Patent No.: US 12,773,841 B2
(45) Date of Patent: Oct. 27, 2026

(54) LAMINATED GLASS

(71) Applicant: AGC INC., Tokyo (JP)

(72) Inventor: Shunsuke Sadakane, Tokyo (JP)

(73) Assignee: AGC INC., Tokyo (JP)

( * ) Notice: Subject to any disclaimer, the term of this patent is extended or adjusted under 35 U.S.C. 154(b) by 195 days.

(21) Appl. No.: 18/896,994

(22) Filed: Sep. 26, 2024

(65) Prior Publication Data

US 2025/0018688 A1 Jan. 16, 2025

Related U.S. Application Data

(63) Continuation of application No. PCT/JP2023/012375, filed on Mar. 28, 2023.

(30) Foreign Application Priority Data

Mar. 30, 2022 (JP) ................................ 2022-055748

(51) Int. Cl.
*B32B 17/10* (2006.01)

(52) U.S. Cl.
CPC .. *B32B 17/10458* (2013.01); *B32B 17/10036* (2013.01); *B32B 17/1011* (2013.01); *B32B 17/10788* (2013.01); *B32B 2307/7376* (2023.05)

(58) Field of Classification Search
CPC ........ B32B 17/10458; B32B 17/10036; B32B 17/1011; B32B 17/10788; B32B 17/0348;
(Continued)

(56) References Cited

U.S. PATENT DOCUMENTS

2016/0056176 A1 2/2016 Kim et al.
2017/0242247 A1* 8/2017 Tso .................. B32B 17/10036
(Continued)

FOREIGN PATENT DOCUMENTS

CN 106646874 A 5/2017
JP 6065221 B2 1/2017
(Continued)

OTHER PUBLICATIONS

International Search Report issued Jun. 13, 2023 in PCT/JP2023/012375 (with English translation), 6 pages.

*Primary Examiner* — Michael Zhang
(74) *Attorney, Agent, or Firm* — Element IP, PLC

(57) ABSTRACT

A laminated glass includes a first glass plate, a second glass plate, and an interlayer which is positioned between the first glass plate and the second glass plate and adheres to the first glass plate and the second glass plate, wherein a target projection area for use in a head-up display and on which P-polarized light can be incident from a direction of the first glass plate is defined in a part of the laminated glass, and a P-polarized light reflecting layer is provided in the target projection area, wherein a residual stress Δσ [MPa] in the target projection area satisfies an inequality by simultaneously satisfying following formulae (1), (2), and (3) with variables Rp, Ts, and t.

$$((1-Rp)\times X\times Ts^2\times Rs)/Rp \leq 0.1 \quad (1)$$

$$X=\sin\delta \quad (2)$$

$$\Delta\sigma=\delta/2\pi\times(\lambda/C)/t \quad (3)$$

16 Claims, 5 Drawing Sheets

(58) Field of Classification Search
CPC .. B32B 2307/7376; B32B 7/023; B02B 27/01
See application file for complete search history.

(56) References Cited

U.S. PATENT DOCUMENTS

| | | | | |
|---|---|---|---|---|
| 2019/0299752 | A1 | 10/2019 | Sadakane et al. | |
| 2021/0060905 | A1* | 3/2021 | Cintora Gonzalez ..... | C03C 4/02 |
| 2021/0122144 | A1* | 4/2021 | Sadakane .................. | B32B 3/02 |
| 2021/0316533 | A1 | 10/2021 | Fischer et al. | |
| 2022/0334300 | A1 | 10/2022 | Sadakane et al. | |
| 2024/0069337 | A1 | 2/2024 | Nishizawa et al. | |

FOREIGN PATENT DOCUMENTS

| | | | | |
|---|---|---|---|---|
| JP | 2017538141 | A | 12/2017 | |
| JP | 6302140 | B2 | 3/2018 | |
| WO | WO-2020017502 | A1 * | 1/2020 | ................ B60J 1/00 |
| WO | WO-2020094423 | A1 | 5/2020 | |
| WO | WO-2021064498 | A1 | 4/2021 | |
| WO | WO-2021145387 | A1 | 7/2021 | |
| WO | WO-2022244873 | A1 | 11/2022 | |

* cited by examiner

FIG.5

| | | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
|---|---|---|---|---|---|---|---|---|---|---|
| FIRST GLASS PLATE A | TYPE | GREEN | GREEN | DARK GREEN | GREEN | CLEAR | CLEAR | CLEAR | CLEAR | CLEAR |
| | PLATE THICKNESS [mm] | 1.8 | 1.8 | 1.8 | 1.8 | 1.8 | 1.8 | 1.8 | 1.6 | 2 |
| | VISIBLE LIGHT TRANSMITTANCE [%] | 87 | 87 | 84 | 87 | 92 | 92 | 92 | 93 | 92 |
| SECOND GLASS PLATE B | TYPE | GREEN | GREEN | DARK GREEN | DARK GREEN | GREEN | DARK GREEN | DARK GREEN | DARK GREEN | DARK GREEN |
| | PLATE THICKNESS [mm] | 1.8 | 1.8 | 1.8 | 1.8 | 1.8 | 1.8 | 1.8 | 1.8 | 2 |
| | VISIBLE LIGHT TRANSMITTANCE [%] | 87 | 87 | 84 | 84 | 87 | 84 | 84 | 84 | 83 |
| INTERLAYER C | VISIBLE LIGHT TRANSMITTANCE [%] | 97 | 97 | 97 | 97 | 97 | 97 | 97 | 97 | 97 |
| LAMINATED GLASS ($\theta$ = 57 deg) | P-POLARIZED LIGHT REFLECTANCE Rp [%] | 10 | 10 | 10 | 10 | 10 | 10 | 10 | 10 | 10 |
| | S-POLARIZED LIGHT TRANSMITTANCE Ts [%] | 73 | 73 | 64 | 68 | 78 | 73 | 73 | 74 | 72 |
| RESIDUAL STRESS $\Delta\sigma$ [MPa] | | 0.9 | 1.3 | 0.9 | 0.9 | 1 | 1 | 0.6 | 0.9 | 1 |
| MULTIPLE IMAGE REFLECTANCE / MAIN IMAGE REFLECTANCE ($\theta$ = 57 deg) | | 8% | 11% | 6% | 7% | 10% | 9% | 5% | 8% | 9% |
| DETERMINATION | | ○ | × | ○ | ○ | ○ | ○ | ◎ | ○ | ○ |

LAMINATED GLASS

BACKGROUND OF THE INVENTION

1. Field of the Invention

The present invention relates to laminated glass.

2. Description of the Related Art

In recent years, the introduction of head-up displays (hereinafter, also referred to as HUD) that display predetermined information in a driver's field of view by reflecting an image on a windshield of a vehicle has been progressing. One of problems in the HUD is to improve visibility of the HUD images, and for this purpose, reduction of multiple images (double images, triple images, etc.) has been attempted.

As an example, there is a technology in which a P-polarized light reflecting layer made of a coating or a film reflecting P-polarized light is applied to laminated glass, the P-polarized light is made incident on the laminated glass so that the incident angle becomes Brewster's angle, and a reflectance of the P-polarized light refracted on an interior surface of the laminated glass on an exterior surface of the vehicle is reduced to minimize multiple images, and the HUD image is clearly projected by mainly reflecting the only P-polarized light reflecting layer.

However, even in a case of laminated glass provided with the P-polarized light reflecting layer, if a glass plate and an interlayer constituting the laminated glass are not properly designed, the multiple image becomes conspicuous and the visibility of the HUD image deteriorates.

An object of the present invention is to improve the visibility of the HUD image by minimizing the multiple image in the laminated glass having the P-polarized light reflecting layer.

CITATION LIST

Patent Literature

[PTL 1] Japanese Patent No. 6302140

SUMMARY OF THE INVENTION

A laminated glass includes a first glass plate, a second glass plate, and an interlayer which is positioned between the first glass plate and the second glass plate and adheres to the first glass plate and the second glass plate, wherein a target projection area for use in a head-up display and on which P-polarized light can be incident from a direction of the first glass plate is defined in a part of the laminated glass, and a P-polarized light reflecting layer is provided in the target projection area, wherein a residual stress $\Delta\sigma$ [MPa] in the target projection area satisfies an inequality by simultaneously satisfying following formulae (1), (2), and (3) with variables Rp, Ts, and t.

$$((1-Rp)\times X\times Ts^2\times Rs)/Rp\leq 0.1 \tag{1}$$

$$X=\sin\delta \tag{2}$$

$$\Delta\sigma=\delta/2\pi\times(\lambda/C)/t \tag{3}$$

In a case where the P-polarized light is incident on the target projection area of the laminated glass from the direction of the first glass plate at an incident angle of 57 deg, P-polarized light reflectance of the laminated glass is referred to as Rp, a P-polarized light transmittance is referred to as (1−Rp), a polarization conversion factor of the first glass plate and the second glass plate is referred to as X, an S-polarized light transmittance of the laminated glass is referred to as Ts, an S-polarized light reflectance of an outer main surface of the second glass plate is referred to as Rs, and a phase difference occurring inside the first glass plate and the second glass plate is referred to as $\delta$; $\pi$ is a circular constant, a wavelength $\lambda$ of the P-polarized light is 555 [nm], a photoelastic coefficient C is configured as 2.8 [(nm/mm)/MPa], and a total thickness of the first glass plate and the second glass plate is referred to as t [mm].

According to one embodiment of the disclosure, the visibility of the HUD image can be improved by minimizing multiple images in the laminated glass having the P-polarized light reflecting layer.

BRIEF DESCRIPTION OF THE DRAWINGS

FIG. 5 is a drawing illustrating examples and a comparative example.

DESCRIPTION OF THE PREFERRED EMBODIMENTS

Figure 1:
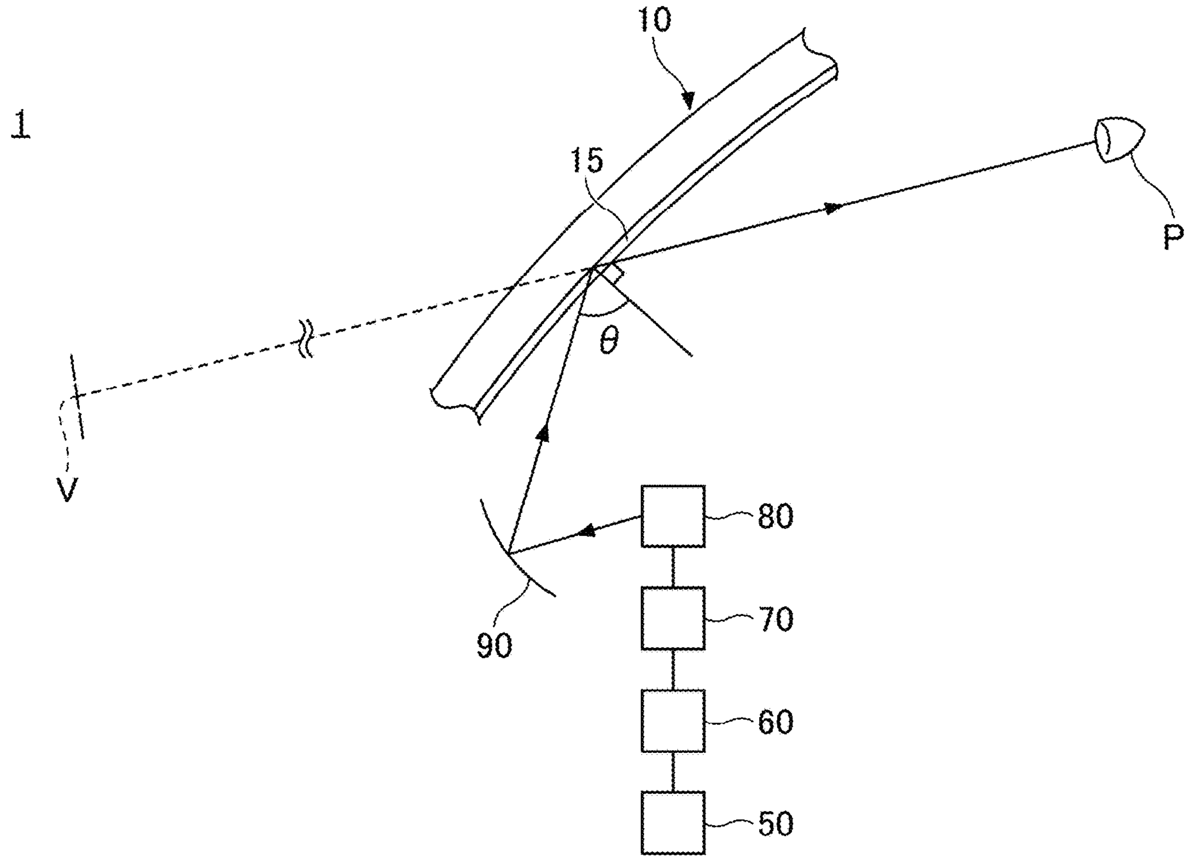
FIG. 1 is a schematic diagram illustrating a HUD system according to a first embodiment.

In the following, embodiments of the present invention will be described with reference to the accompanying drawings. In the drawings, the same constituent elements are denoted with the same reference numerals, and redundant description thereabout may be omitted. In each of the drawings, sizes and shapes may be partially exaggerated so that the contents of the invention can be easily understood.

Note that, a vehicle typically refers to an automobile, but also refers to any moving bodies capable of mounting laminated glass, including a train, a ship, an aircraft, etc.

A plan view refers to viewing an object from a direction of a normal passing through a center of gravity of a main surface of the object, and a shape seen at that time is called a planar shape.

Expressions "upper" and "lower" refer to upper and lower portions when the laminated glass is attached to the vehicle.

An outermost periphery of a predetermined member is referred to as a "peripheral edge", and an area of a predetermined member having a width inscribed on the "peripheral edge" is referred to as a "peripheral part".

First Embodiment

[HUD System]

FIG. 1 is a schematic diagram illustrating a HUD system according to a first embodiment. The HUD system 1 shown in FIG. 1 includes a laminated glass 10, a light source 50, a first optical system 60, an image display element 70, a second optical system 80, and a concave mirror 90. The HUD system 1 is a vehicular head-up display system for displaying a virtual image on the outside of the laminated glass 10. In the HUD system 1, the first optical system 60 and the second optical system 80 may be provided as necessary.

The laminated glass 10 is, for example, a windshield for a vehicle, and P-polarized visible light is incident from the interior of the vehicle. The laminated glass 10 includes a P-polarized light reflecting layer 15 in an area where the P-polarized visible light reflected by the concave mirror 90 is incident. The P-polarized light reflecting layer 15 may be formed on an entire surface of the laminated glass 10, or may be formed only in a visible light transmitting area of the laminated glass 10 excluding a shielding layer 14 described later. The P-polarized light reflecting layer 15 may be formed at least in an area irradiated with P-polarized light from the light source 50, and an edge of the P-polarized light reflecting layer 15 may be formed in a vicinity of the outer periphery of the laminated glass 10 or on or near the shielding layer 14 to make the edge inconspicuous.

The light source 50 is a light source for emitting P-polarized visible light, such as a light-emitting diode or a laser. The light source 50 may include an optical component such as a polarizing plate or a lens to convert S-polarized light into P-polarized light. The light source 50 includes, for example, three light sources: a red light source, a green light source, and a blue light source.

The first optical system 60 is composed of, for example, a prism or a lens to synthesize lights emitted from the plurality of light sources. The image display element 70 is an element for generating an intermediate image, and is, for example, a liquid crystal display element or an organic light-emitting element. The second optical system 80 is composed of, for example, a lens or a reflecting mirror. The concave mirror 90 is an optical component to reflect the intermediate image on a reflecting surface having a predetermined curvature, and is arranged at a position closest to the laminated glass 10 among the optical components arranged on the optical path between the light source 50 and the laminated glass 10.

In the HUD system 1, the light emitted from the light source 50 reaches the image display element optical system 60, and an 70 via the first intermediate image is formed on the image display element 70. The intermediate image formed by the image display element 70 is enlarged by passing through the second optical system 80 and the concave mirror 90, and is irradiated onto the P-polarized light reflecting layer 15 of the laminated glass 10. The intermediate image irradiated onto the P-polarized light reflecting layer 15 is mainly reflected by the P-polarized light reflecting layer 15 and guided to a viewpoint position P of an occupant, and the occupant recognizes the intermediate image as a virtual image V (HUD image) in front of the laminated glass 10. The occupant is, for example, a driver of a vehicle.

In FIG. 1, θ is an incident angle at which the P-polarized visible light emitted from the light source 50 is incident on the P-polarized light reflecting layer 15 through a predetermined optical system. The incident angle θ may be 57 deg (Brewster's angle), may be larger than 57 deg, or may be smaller than 57 deg.

The e HUD system 1 may have any other configuration as long as it includes at least the laminated glass 10 and the light source 50. The HUD system 1 may be, for example, a laser scanning system in which a laser beam is scanned by an optical scanning unit made of MEMS (Micro Electro Mechanical Systems) or the like.

[Laminated Glass]

Figure 2A:
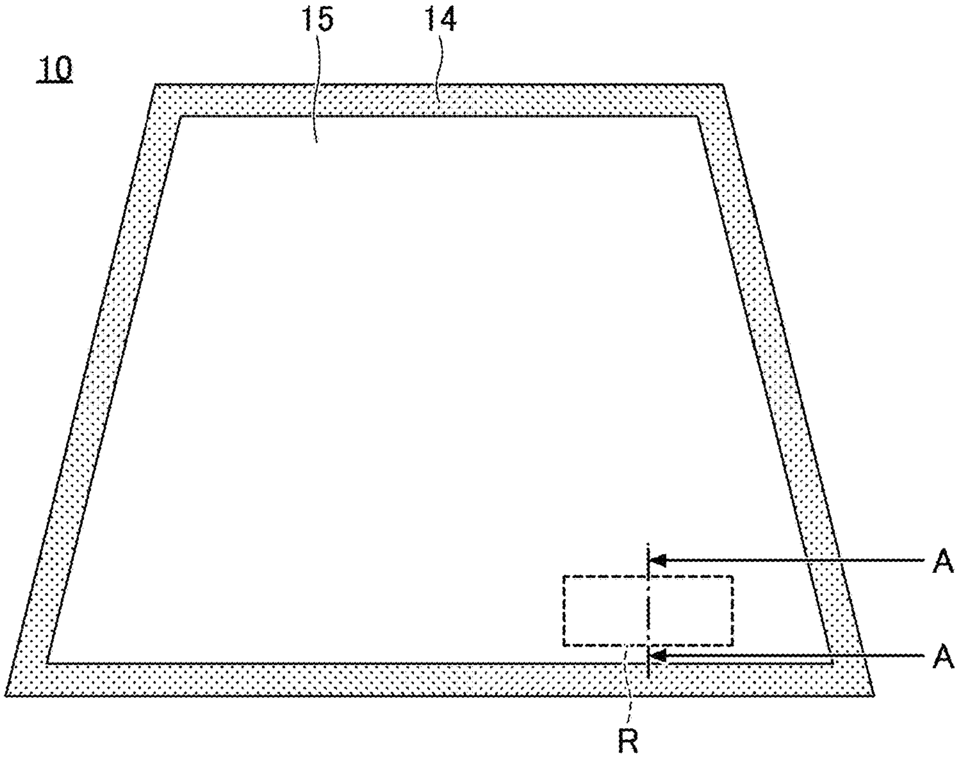
FIG. 2A is a drawing illustrating a laminated glass according to a first embodiment visually recognized from an interior of a vehicle to an exterior of the vehicle.
Figure 2B:
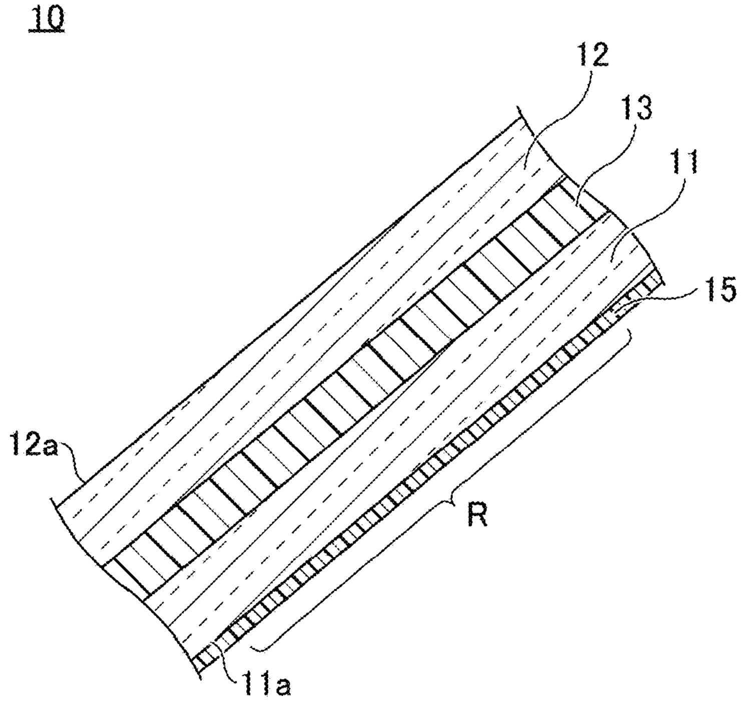
FIG. 2B is a sectional view partially enlarged along a line A-A in FIG. 2A.

FIG. 2A and FIG. 2B are drawings illustrating a laminated glass according to a first embodiment. FIG. 2A is a view schematically showing a state in which the laminated glass is visually recognized from the interior of the vehicle to the exterior of the vehicle, and FIG. 2B is a partially enlarged sectional view along a line A-A in FIG. 2A.

As shown in FIG. 2A and FIG. 2B, the laminated glass 10 is a vehicular laminated glass including a first glass plate 11, a second glass plate 12, an interlayer 13, a shielding layer 14, and a P-polarized light reflecting layer 15. The laminated glass 10 can be applied, for example, to a windshield of a vehicle.

The first glass plate 11 and the second glass plate 12 are adhered to each other through an interlayer 13. The first glass plate 11 is disposed on a first side that is the interior side when the laminated glass 10 is mounted on the vehicle, and the second glass plate 12 is disposed on a second side that is the exterior side when the laminated glass 10 is mounted on the vehicle. The shielding layer 14 is provided as needed.

The laminated glass 10 is, for example, a complexly curved shape curved in both the vertical and horizontal directions when mounted on the vehicle. However, the complexly curved shape is not limited to a shape curved in both the vertical and horizontal directions when mounted on the vehicle, and includes a shape curved in two or more arbitrary different directions. Alternatively, the laminated glass 10 may be a single curved shape curved only in the vertical or horizontal direction when mounted on the vehicle. However, the single curved shape is not limited to a shape curved only in the vertical or horizontal direction when mounted on the vehicle, and includes a shape curved only in one arbitrary direction.

The laminated glass 10 is preferably curved to be convex toward the outside of the vehicle. That is, the second glass plate 12 is preferably curved to be convex toward the side opposite to the interlayer 13, and the first glass plate 11 is preferably curved to be convex toward the side of the interlayer 13. In FIG. 2A, the laminated glass 10 has a trapezoidal shape in a plan view, but the laminated glass 10 is not limited to a trapezoidal shape and may be any shape including a rectangular shape.

The first glass plate 11 is a vehicle-inside glass plate that becomes the vehicle-inside (first surface) when the laminated glass 10 is attached to the vehicle. The second glass plate 12 is a vehicle-outside glass plate that becomes the vehicle-outside (second surface) when the laminated glass 10 is attached to the vehicle.

The minimum value of the radius of curvature of the laminated glass 10 is preferably from 500 mm to 100,000 mm. The radii of curvature of the first glass plate 11 and the second glass plate 12 may be the same or different. When the first glass plate 11 and the second glass plate 12 have different radii of curvature, the radius of curvature of the first glass plate 11 is preferably smaller than that of the second glass plate 12.

The first glass plate 11 and the second glass plate 12 are a pair of glass plates facing each other, and the interlayer 13 is positioned between the pair of glass plates. The first glass plate 11 and the second glass plate 12 are fixed with the interlayer 13 located therebetween. The interlayer 13 is a film to adhere to the first glass plate 11 and the second glass plate 12.

An outer peripheral lateral surface of the interlayer 13 is preferably edge treated. That is, the outer peripheral lateral surface of the interlayer 13 is preferably treated so as not to greatly protrude from the outer peripheral lateral surfaces of the first glass plate 11 and the second glass plate 12. It is preferable that the amount of protrusion of the outer peripheral lateral surface of the interlayer 13 from the outer peripheral lateral surfaces of the first glass plate 11 and the second glass plate 12 is 150 μm or less in terms of not deteriorating appearance. Details of the first glass plate 11, the second glass plate 12 and the interlayer 13 will be described later.

The shielding layer 14 is an opaque layer and, for example, is provided in a band shape along the peripheral part of the laminated glass 10. The shielding layer 14 is, for example, an opaque colored ceramic layer, and although the color is arbitrary, dark colors such as black, brown, gray, and deep blue are preferable, and black is more preferable. The shielding layer 14 may be a colored interlayer or a colored film having light shielding properties, a combination of the colored interlayer and the colored ceramic layer, or a layer having a dimming function. The colored film may be integrated with an infrared reflecting film or the like.

The width of the shielding layer 14 in a plan view is, for example, about 10 mm to 250 mm, preferably 20 mm to 220 mm, and more preferably 30 mm to 200 mm. The presence of the opaque shielding layer 14 on the laminated glass 10 can prevent the degradation by ultraviolet rays of an adhesive made of a resin such as urethane for holding the peripheral part of the laminated glass 10 on the vehicle body.

The shielding layer 14 can be formed, for example, by applying a ceramic color paste containing a fusible glass frit containing a black pigment on a glass plate by screen printing or the like and baking the same. The shielding layer 14 may be formed, for example, by applying an organic ink containing a black or dark pigment on a glass plate by screen printing or the like, and then drying.

The shielding layer 14 is provided, for example, only on the peripheral part of the inner main surface of the second glass plate 12. However, the shielding layer 14 may be provided only on the peripheral part of the outer main surface 11*a* of the first glass plate 11, or may be provided on both the peripheral part of the inner main surface of the second glass plate 12 and the peripheral part of the outer main surface 11*a* of the first glass plate 11. In the first glass plate 11 and the second glass plate 12, the inner main surface refers to a surface facing the interlayer 13, and the outer main surface refers to a surface on the opposite side of the inner main surface.

Figure 3:
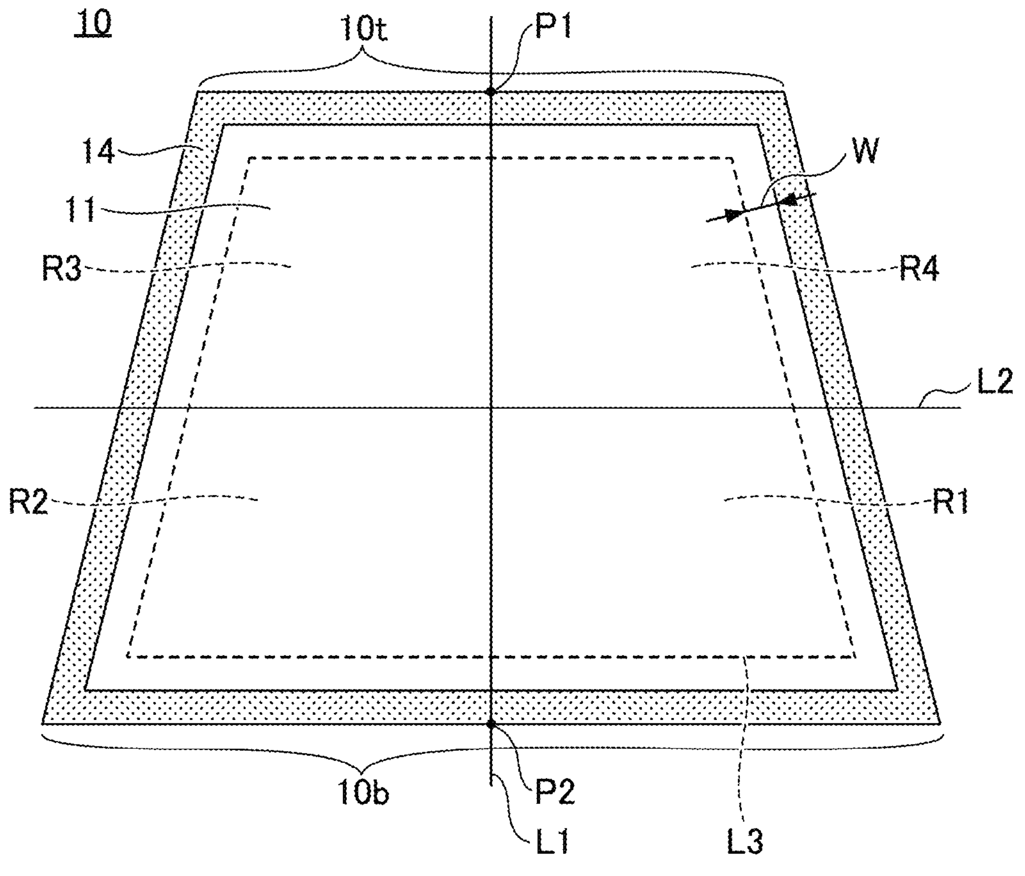
FIG. 3 is a drawing describing a target projection area.

In a part of the laminated glass 10, a target projection area in which P-polarized light can enter from a direction of the first glass plate 11 side, which is for use in the head-up display, is defined. A P-polarized light reflecting layer 15 is provided in the target projection area. The target projection area will be described with reference to FIG. 3. FIG. 3 is a drawing describing a target projection area, and is a view schematically showing a state in which the laminated glass is visually recognized from the interior of the vehicle to the exterior of the vehicle. In FIG. 3, a dividing line L1 is a straight line passing through a point P1 bisecting the upper edge 10*t* of the laminated glass 10 and a point P2 bisecting the lower edge 10*b* in a plan view. A dividing line L2 is a straight line orthogonal to the dividing line L1 and bisecting a portion between the points P1 and P2 of the dividing line L1 in a plan view. A dividing line L3 is a line showing a position W=5 mm inside the inner edge of the shielding layer 14 in a plan view. In the example of FIG. 3, the dividing line L3 is a trapezoid.

An area surrounded by the dividing line L3 is divided into four areas R1, R2, R3, and R4 by the dividing lines L1 and L2. The areas R1, R2, R3, and R4 are target projection areas. The laminated glass 10 may be provided with a sensor area in which a sensor such as a camera transmits and/or receives information. However, a small independent transparent area surrounded by a shielding layer such as the sensor area is not included in the target projection area. The target projection area can reflect light emitted from the light source of the HUD system arranged in the vehicle when the laminated glass is installed in the vehicle.

As shown in FIG. 2A and FIG. 2B, a HUD display area R for use in the HUD is defined in the laminated glass 10. The HUD display area R is a display area for displaying information by reflecting a projected image from inside the vehicle. The HUD display area R is a range in which light from the light source 50 irradiates the laminated glass 10 when the HUD display position is moved in the eye box based on SAE J1757-2 (2018).

The HUD display area R is provided in any of the areas R1, R2, R3, and R4 of the target projection area shown in FIG. 3. In an example of FIG. 2A and FIG. 2B, the HUD display area R is provided in the area R1 shown in FIG. 3, but may be provided in the areas R2, R3, or R4. The HUD display area R may be provided over any two or more of the areas R1, R2, R3, and R4 shown in FIG. 3. The HUD display area R may be provided in a plurality of locations within the areas R1, R2, R3, and R4 shown in FIG. 3.

In the example of FIG. 2A and FIG. 2B, the P-polarized light reflecting layer 15 is provided over the entire outer main surface 11*a* of the first glass plate 11. However, the P-polarized light reflecting layer 15 may be provided only in the HUD display area R and its neighboring areas. It should be noted that when the P-polarized light reflecting layer 15 is provided on the entire outer main surface 11*a* of the first glass plate 11, the boundary between the area where the P-polarized light reflecting layer 15 is provided and its peripheral area is preferably not visible.

The P-polarized light reflecting layer 15 is a film that reflects visible light of P-polarized light incident from the concave mirror 90 toward the interior of the vehicle, for example, a P-polarized light reflecting coating coated on the outer main surface 11*a* of the first glass plate 11. A P-polarized light reflecting film may be used as the P-polarized light reflecting layer 15 and attached to the outer main surface 11*a* of the first glass plate 11 via an adhesive layer. The P-polarized light reflecting layer 15 is transparent to visible light.

As the P-polarized light reflecting layer 15, for example, a birefringence interference type polarizer made of a polymer multilayer film containing two or more types of polymers having different refractive indices, a wire grid type polarizer having a fine uneven structure, a film including a polarizer made of a cholesteric liquid crystal layer, or the like may be employed. When a P-polarized light reflecting film is used as the P-polarized light reflecting layer 15, the thickness of the P-polarized light reflecting film is preferably from 25 μm to 200 μm. The thickness of the P-polarized light reflecting film is more preferably 150 μm or less, and more preferably 100 μm or less.

The use of a P-polarized reflective coating as the P-polarized light reflecting layer 15 is preferable compared with the use of a P-polarized light reflecting film in that visibility is superior in a case of low luminance such as at night and in a wider viewing angle. The use a P-polarized reflective coating is also preferable in that it is easy to control the film thickness and that the reflecting surface tends to be smoothed so that the HUD image does not tend to be distorted.

When a P-polarized reflective coating is used as the P-polarized light reflecting layer 15, the film thickness of the P-polarized reflective coating is, for example, from 50 nm to 500 nm, preferably from 50 nm to 400 nm, and more preferably from 50 nm to 300 nm.

Examples of the P-polarized reflective coating include a film having a certain P-polarized light reflectance, for example, a film a having laminated structure of high and low refractive index films, and a Low-e film. Of these, a film having a laminated structure of high and low refractive index films is preferable in that the P-polarized light reflectance can be maintained high. When the film of high and low refractive index films has a two-layer structure, for example, a high refractive index film and a low refractive index film are laminated in this order on the outer main surface 11*a* of the first glass plate 11. When the film of high and low refractive index film has a three-layer structure or more, a high refractive index film and a low refractive index film are alternately laminated in an arbitrary order on the outer main surface 11*a* of the first glass plate 11.

The refractive index of the high refractive index film is 1.8 or more, 1.9 or more, 2.0 or more, 2.1 or more, and preferably 2.5 or less at a wavelength of 550 nm. The refractive index of the low refractive index film is typically less than 1.8, 1.7 or less, 1.6 or less, and preferably 1.2 or more at a wavelength of 550 nm.

Specifically, the high refractive index film preferably includes at least one of the following: an oxide of Zr, Nb, Sn; a mixed oxide of Ti, Zr, Nb, Si, Sb, Sn, Zn, In; a nitride of Si, Zr; or a mixed nitride of Si, Zr. The low refractive index film preferably includes at least one of the following: silicon oxide, silicon oxynitride, silicon oxycarbide, or a mixture, for example, a mixed oxide of silicon and aluminum; or a mixed oxide of silicon and zirconium.

The first layer of the high refractive index film is optionally composed of one or more sublayers. The thickness (geometric thickness) of the first layer of the high refractive index film is preferably 50 nm to 100 nm, particularly preferably 60 nm to 80 nm. The first layer of the low refractive index film is optionally composed of one or more sublayers. The thickness (geometric thickness) of the first layer of the low refractive index film is preferably 70 nm to 160 nm, particularly preferably 80 nm to 120 nm.

The P-polarized reflective coating can be formed on the surface of a glass plate by, for example, sputtering or CVD.

The field of view (FOV) of the HUD image may be 4 deg×1 deg or more, 5 deg×1.5 deg or more, 6 deg×2 deg or more, and 7 deg×3 deg or more. When the P-polarized light reflecting film is used as the P-polarized light reflecting layer 15, when the FOV of the HUD image is 4 deg×1 deg or more, a HUD image larger than the conventional HUD image is projected on the laminated glass 10, and the waviness of the P-polarized light reflecting film becomes easier to see. Therefore, it is preferable to control the thickness of the adhesive layer which adheres the P-polarized film to an appropriate value and to reduce the distortion of the HUD image.

In the HUD display area R of the laminated glass 10, the curvature in the horizontal direction is preferably 1000 mm to 100,000 mm in radius. In the HUD display area R of the laminated glass 10, the curvature in the vertical direction is preferably 4000 mm to 20,000 mm in radius, and more preferably 6000 mm to 20,000 mm in radius. If the curvatures in the vertical and horizontal directions are within the above ranges, the P-polarized light reflecting layer 15 is less likely to be wavy, so that distortion of the HUD image projected on the P-polarized light reflecting layer 15 can be reduced. Here, the horizontal direction is the direction of the dividing line L2 in FIG. 3, and the vertical direction is the direction of the dividing line L1.

If the incident angle of the P-polarized light incident on the P-polarized light reflecting layer is 57 deg and all of the incident P-polarized light is reflected by the P-polarized light reflecting layer 15, only the main image is generated and no multiple image is generated. Conversely, if all of the incident P-polarized light is not reflected by the P-polarized light reflecting layer 15, a multiple image is generated. The image observed at the highest luminance is the main image, and the image observed at a lower luminance than the main image is the multiple image.

If the design of the first glass plate 11, the second glass plate 12, and the interlayer 13 constituting the laminated glass 10 is not appropriate, the multiple image becomes conspicuous. For example, when P-polarized light is incident on the inside of the laminated glass 10, if residual stress exists in the first glass plate 11 and the second glass plate 12, a part of the P-polarized light is converted into S-polarized light and becomes elliptically polarized light. The S-polarized component of the elliptically polarized light is reflected by the outer main surface 12*a* of the second glass plate 12, travels toward the first glass plate 11, passes through the P-polarized light reflecting layer 15, and is emitted to the outside of the laminated glass 10, thereby generating a multiple image.

In particular, in the laminated glass 10, residual stress is high in an area close to the shielding layer 14. This is because, when the first glass plate 11 and the second glass plate 12 are heated, bent, and cooled slowly, the shielding layer 14 is hard to cool, and the portion without the shielding layer 14 is easy to cool. Therefore, when the HUD display area R is provided at a position close to the shielding layer 14, the multiple image caused by the residual stress is particularly easy to be conspicuous. Therefore, in the laminated glass 10, the multiple image is minimized and the visibility of the HUD image is improved by defining an appropriate relationship between the residual stress and the reflectance of P-polarized light and the like in the target projection area. This will be described below.

According to a study by the inventors, the multiple image becomes inconspicuous when the multiple image reflectance/main image reflectance is 10% or less. In order to make the multiple image less conspicuous, the multiple image reflectance/main image reflectance is preferably 7% or less, more preferably 5% or less, and still more preferably 3% or less. The multiple image reflectance/main image reflectance is a ratio of the multiple image luminance to the main image luminance when P-polarized light is incident on the laminated glass 10 from the inside of the vehicle and the main image luminance and the multiple image luminance are respectively measured by a luminance meter. The luminance is measured based on SAE J1757-2 (2018). The main image luminance is the luminance of the image reflected by the main reflecting surface. The main reflecting surface is the surface on which the image observed with the highest luminance is reflected among a plurality of images observed when P-polarized light is incident on the laminated glass 10 from the inside of the vehicle, and in the present embodiment, is the surface of the P-polarized light reflecting layer 15 on the surface facing the first glass plate 11.

The laminated glass 10 is designed so that the residual stress Δσ [MPa] in the target projection area satisfies the inequality obtained by combining the following formulae (1), (2), and (3) with Rp, Ts, and t as variables. The residual stress Δσ in the target projection area is the difference (principal stress difference) between the principal stresses (values integrated along the cross-sectional direction) acting in the plane direction between the first glass plate 11 and the second glass plate 12 in the target projection area. That is, the residual stress Δσ in the laminated glass 10 is the difference between the principal stresses acting in the plane direction of the laminated glass 10, and can be measured using a photoelastic stress measurement system "Edge Master" manufactured by Stress Photonics, Inc. The "Edge Master" is a device to measure the residual stress at the edge portion of the laminated glass, but the residual stress Δσ in the target projection area can be measured by removing a jig or the like. The residual stress Δσ may mean either compressive stress or tensile stress, and its absolute value is used regardless of its sign.

$$((1-Rp)\times X\times Ts^2\times Rs)/Rp\leq 0.1 \quad (1)$$

$$X=\sin\delta \quad (2)$$

$$\Delta\sigma=\delta/2\pi\times(\lambda/C)/t \quad (3)$$

In the case where P-polarized light enters the target projection area of the laminated glass at an incident angle of 57 deg from the direction of the first glass plate 11, the P-polarized light reflectance of the laminated glass 10 is Rp, the P-polarized light transmittance is (1−Rp), the polarization conversion factor of the first glass plate 11 and the second glass plate 12 is X, the S-polarized light transmittance of the laminated glass 10 is Ts, the S-polarized light reflectance of the outer main surface 12*a* of the second glass plate 12 is Rs, and the phase difference occurring inside the first glass plate 11 and the second glass plate 12 is δ. Further, with n representing the number pi, assume that the wavelength λ of the P-polarized light is 555 [nm], the photoelastic coefficient C is 2.8 [(nm/mm)/MPa], and the total thickness of the first glass plate and the second glass plate is t [mm]. Note that in Formula (1), the units of the P-polarized light reflectance Rp, the P-polarized light transmittance (1−Rp), the polarization conversion factor X, and the S-polarized light reflectance Rs are not expressed as [%]. For example, if the S-polarized light reflectance Rs is 50 [%], the S-polarized light reflectance Rs is 0.5 in formula (1). When the P-polarized light reflectance Rp, the P-polarized light transmittance (1−Rp), the polarization conversion factor X, and the S-polarized light reflectance Rs are expressed as a fraction of 100, the unit of [%] is specified.

The S-polarized light reflectance Rs of the outer main surface 12*a* of the second glass plate 12 is obtained by $Rs=((N_0 \cos\theta_0-N_1 \cos\theta_1)/(N_0 \cos\theta_0+N_1 \cos\theta_1))^2$, where the incident angle of the P-polarized light incident on the laminated glass 10 is $\theta_0$ [deg], the refractive angle of the P-polarized light incident on the laminated glass 10 is $\theta_1$ [deg], the refractive index of the air is $N_0$, and the refractive index of the second glass plate 12 is $N_1$. Here, $\theta_1=\arcsin(N_0/N_1\times\sin\theta_0)$. $\theta_0=57$ [deg], and $N_0=1$. $N_1$ differs depending on the type of the second glass plate 12, for example, $N_1=1.52$.

Formula (3) can be derived from Brewster's law. In formula (3), λ=555 [nm] is set because human vision sensitivity is highest at this wavelength.

In the formula (1), the denominator Rp represents the main image reflectance, and the numerator $((1-Rp)\times X\times Ts^2\times Rs)$ represents the multiple image reflectance. That is, if the intensity of the P-polarized light incident on the laminated glass 10 is I, the P-polarized light of intensity Rp×I is reflected on the surface of the laminated glass 10. This is the intensity of the main image. Additionally, the P-polarized light of intensity (1−Rp)×I enters the inside of the laminated glass 10. A part of the P-polarized light of intensity (1−Rp)×I that enters the inside of the laminated glass 10 is converted into the S-polarized light of intensity (1−Rp)×X×I based on the polarization conversion factor X. The S-polarized light multiplied by the light polarized transmittance Ts reaches the outer main surface 12*a* of the second glass plate 12. That is, the intensity of the S-polarized light that reaches the outer main surface 12*a* is (1−Rp)×X×Ts×I.

Of the S-polarized light that reaches the outer main surface 12*a*, the S-polarized light multiplied by the S-polarized light reflectance Rs of the outer main surface 12*a* is reflected by the outer main surface 12*a*, and the S-polarized light multiplied by the light polarized transmittance Ts reaches the outer main surface 11*a* of the first glass plate 11, passes through the P-polarized light reflecting layer 15, and exits the laminated glass 10. That is, the intensity of the S-polarized light that exits the laminated glass 10 is $(1-Rp)\times X\times Ts^2\times Rs\times I$. This is the intensity of the multiple image. Here, the reflection of the S-polarized light on the outer main surface 11*a* and the P-polarized light reflecting layer 15 and the absorption of the S-polarized light on the laminated glass 10 are not included in the calculation. This is because the intensity of the S-polarized light can be more strictly evaluated if these are ignored.

Therefore, when the residual stress Δσ in the target projection area satisfies the inequality obtained by combining the formulae (1), (2), and (3), the multiple image reflectance/main image reflectance can be made 0.1 or less, that is, 10% or less when expressed by percentage in the laminated glass 10, and the multiple image can be made less conspicuous. That is, by reducing the residual stress Δσ in the target projection area in the laminated glass 10, destruction of the polarization state of the P-polarized light and generation of S-polarized light can be prevented. Thus, the multiple image can be minimized and the visibility of the HUD image can be improved.

It should be noted that the P-polarized light reflectance Rp is obtained by measuring a spectral reflectance described in JIS R3106: 2019 with the P-polarized light at the visible wavelength as incident light at the incident angle θ=57 deg, and subsequently calculating according to a visible light reflectance calculating method described in JIS R3106: 2019 based on the spectral reflectance. Moreover, the S-polarized light transmittance Ts is obtained by measuring the spectral transmittance described in JIS R3106: 2019 with the S-polarized light as incident light, and subsequently calculating according to a visible light transmittance calculating method described in JIS R3106: 2019 based on the spectral transmittance.

The residual stress Δσ is preferably 1 MPa or less, more preferably 0.8 MPa or less, further preferably 0.7 MPa or less, further preferably 0.6 MPa or less, and particularly preferably 0.4 MPa or less. For example, the residual stress Δσ can be reduced by lengthening the slow cooling time when the first glass plate 11 and the second glass plate 12 are molded and slowly cooled. When the first glass plate 11 and the second glass plate 12 are press-molded, the residual stress Δσ can also be reduced by suppressing the temperature distribution in the glass surface in a vacuum process using a vacuum nozzle or a slow cooling process using a blower. It is particularly preferable that the first glass plate 11 and the second glass plate 12 are molded by press-molding from the viewpoint of minimizing the distortion of the HUD image, but the residual stress $\Delta\sigma$ can be reduced as in the present embodiment by lowering the bending temperature of the glass and taking a longer time in the slow cooling process than in the related art.

The S-polarized light transmittance of the first glass plate 11 and/or the second glass plate 12 at an incident angle of 57 deg into the target projection area is preferably 70% or less, and more preferably 65% or less. With such a value, since the S-polarized light transmittance Ts of the laminated glass 10 can be reduced, the intensity of the S-polarized light emitted to the outside of the laminated glass 10 can be reduced, and the secondary image can be made less conspicuous. The S-polarized light transmittance Ts of the laminated glass 10 is preferably 80% or less, more preferably 75% or less, further preferably 70% or less, and further preferably 65% or less.

In the target projection area, the visible light transmittance of the first glass plate 11 and/or the second glass plate 12 may be 87% or less or 84% or less. With such a value, the intensity of the S-polarized light emitted to the outside of the laminated glass 10 can be reduced, and the secondary image can be made inconspicuous. When the visible light transmittance of the first glass plate 11 and/or the second glass plate 12 is low, heat is easily absorbed when the glass plate is molded and residual stress is easily generated. However, in the laminated glass 10, the visible light transmittance of the first glass plate 11 and/or the second glass plate 12 may be reduced because residual stress can be reduced by, for example, lengthening the slow cooling time when the first glass plate 11 and the second glass plate 12 are molded and slowly cooled. The visible light transmittance can be measured by a method conforming to JIS R3106: 2019. It is preferable that the visible light transmittance of the laminated glass 10 is 70% or more in the target projection area.

The difference in the visible light transmittance between the first glass plate 11 and the second glass plate 12 may be 3% or more, 5% or more, or 8% or more in the target projection area. If there is a difference the in visible light transmittance between the first glass plate 11 and the second glass plate 12, residual stress is likely to occur because there is a difference in the slow cooling time when the glass plate is molded. However, in the laminated glass 10, since the residual stress can be reduced by lengthening the slowly cooling time when the first glass plate 11 and the second glass plate 12 are molded and slowly cooled, there may be a difference in the visible light transmittance between the first glass plate 11 and the second glass plate 12.

In the target projection area, the thickness of the second glass plate 12 may be 1.9 mm or more, 2.2 mm or more, or 2.4 mm or more. With such a value, the strength of the flying-stone resistance and the like is sufficient. When the thickness of the second glass plate 12 is thick, heat is easily absorbed when the glass plate is molded and residual stress is easily generated. However, in the laminated glass 10, the residual stress can be reduced by lengthening the slow cooling time when the second glass plate 12 is molded and slowly cooled, so that the thickness of the second glass plate 12 may be increased.

In the target projection area, the total thickness of the laminated glass 10 is preferably 4.6 mm or less, and more preferably 4.4 mm or less. By reducing the total thickness of the laminated glass 10, the separation amount of the multiple image from the main image is reduced, so that the multiple image can be made inconspicuous. In addition, the laminated glass 10 can be reduced in weight. When the visible light transmittance of the first glass plate 11 is larger than the visible light transmittance of the second glass plate 12, it is preferable in that the total thickness of the laminated glass 10 can be reduced while keeping the multiple image dark.

In the target projection area, the thickness of the first glass plate 11 may be 1.8 mm or less, 1.6 mm or less, 1.3 mm or less, 1.0 mm or less, 0.7 mm or less, or 0.5 mm or less. With such a value, the total thickness of the laminated glass 10 can be reduced while maintaining the thickness of the second glass plate 12. As a result, the separation amount of the multiple image from the main image can be reduced and the weight can be reduced in the laminated glass 10.

In the target projection area, the difference in thickness between the first glass plate 11 and the second glass plate 12 may be 0.1 mm or more, or 0.3 mm or more. If there is a difference in thickness between the first glass plate 11 and the second glass plate 12, residual stress is likely to occur because there is a difference in the slow cooling time when the glass plate is formed. However, in the laminated glass 10, since the residual stress can be reduced by lengthening the slow cooling time when the first glass plate 11 and the second glass plate 12 are formed and slow cooled, there may be a difference in thickness between the first glass plate 11 and the second glass plate 12.

The S-polarized light transmittance of the interlayer 13 at an incident angle of 57 deg to the target projection area is preferably 73% or less. With such a value, since the S-polarized light transmittance Ts of the laminated glass 10 can be the intensity of the S-polarized light reduced, emitted to the outside of the laminated glass 10 can be reduced, and the secondary image can be made less conspicuous.

In the target projection area, the visible light transmittance of the interlayer 13 may be 90% or more. In this case, it is preferable to reduce the visible light transmittance of the first glass plate 11 and/or the second glass plate 12 to attenuate the secondary image. However, as described above, when the visible light transmittance of the first glass plate 11 and/or the second glass plate 12 is low, heat is easily absorbed when the glass plate is molded and residual stress is easily generated. However, in the laminated glass 10, the visible light transmittance of the first glass plate 11 and/or the second glass plate 12 may be reduced because the residual stress can be reduced by lengthening the slow cooling time when the first glass plate 11 and the second glass plate 12 are molded and slowly cooled.

In the target projection area, the P polarized light reflectance Rp of the laminated glass 10 is preferably 10% or more. When the P polarized light reflectance Rp of the laminated glass 10 is 10% or more, the main image becomes sufficiently bright and the visibility of the HUD image is improved. In addition, since the multiple image reflectance/main image reflectance is increased, a multiple image can be made less conspicuous.

In the target projection area, the P-polarized light reflectance Rp of the laminated glass 10 is preferably 12% or more, and more preferably 15% or more. The higher the P-polarized light reflectance Rp of the laminated glass 10, the higher the luminance of the main image, so that the visibility of the HUD image is further improved. In addition, since the multiple image reflectance/main image reflectance is further increased, the multiple image can be further reduced in conspicuity.

In the target projection area, the P-polarized light reflectance Rp of the laminated glass 10 is preferably 25% or less, and more preferably 20% or less. When the P-polarized light reflectance Rp of the laminated glass 10 is 25% or less, the reflection of interior materials such as the instrument panel of the vehicle can be suppressed, and when it is 20% or less, the reflection can be further suppressed.

In general, in a HUD system having a P-polarized light reflecting layer, a light source and an optical system are installed so that the incidence angle of P-polarized light incident on the P-polarized light reflecting layer is in the vicinity of 57 deg. However, in a HUD system having a P-polarized light reflecting layer, the incidence angle θ may deviate from 57 deg because the position where the light source and the optical system can be installed in the vehicle is limited. In the laminated glass 10, since the residual stress Δσ is reduced, the dependence of the multiple image on the incident angle is small, and the multiple image is hardly conspicuous even when the incident angle θ deviates from 57 deg. Therefore, in at least a part of the HUD display area R, the incident angle θ may be 60 deg or more, or 65 deg or more. However, when the incident angle θ deviates significantly from 57 deg, the multiple image becomes conspicuous because the light transmitted through the P-polarized light reflecting layer 15 increases. Therefore, the incident angle θ is preferably 42 deg or more and 72 deg or less, more preferably 47 deg or more and 67 deg or less, and further preferably 52 deg or more and 62 deg or less.

All of the HUD display areas R are preferably 100 mm or more away from the edge of the laminated glass 10 and 20 mm or more away from the edge of the shielding layer 14 in a plan view. This is because the residual stress Δσ becomes smaller when the HUD display areas R are 100 mm or more away from the edge of the laminated glass 10 and 20 mm or more away from the edge of the shielding layer 14 in a plan view. At least a part of the HUD display areas R may be arranged in an area within 200 mm from the edge of the laminated glass 10 or within 100 mm from the edge of the shielding layer 14. This is because the residual stress Δσ of the laminated glass 10 is sufficiently small even in this area.

The laminated glass 10 may be designed so that the residual stress Δσ satisfies the inequality obtained by combining the formulae (1), (2), and (3) only in any one to three areas among the areas R1, R2, R3, and R4 which are the target projection areas. For example, the laminated glass 10 may be designed so that the residual stress Δσ satisfies the inequality obtained by combining the formulae (1), (2), and (3) only in the area R1 which is the target projection area. In this case, the HUD system 1 may be designed so that the HUD display area R is provided in the area R1. That is, in the present application, "The residual stress Δσ in the target projection area satisfies inequalities obtained by combining formulae (1), (2) and (3) with Rp, Ts and t as variables." means that the residual stress Δσ satisfies the inequality obtained by combining the formulae (1), (2), and (3) in any one or more areas among the areas R1, R2, R3, and R4.

It should be noted that the conspicuity of the multiple image also varies depending on the projection distance of the HUD image. The projection distance of the HUD image is preferably 2 m or more, more preferably 3 m or more, further preferably 5 m or more, and particularly preferably 10 m or more. Here, the projection distance of the HUD image is the distance from the center of the eye box to the focal position of the virtual image V according to SAE J1757-2 (2018). The measurement method of the focal length of the HUD is according to SAE J1757-2 (2018). As the projection distance of the HUD image becomes longer, the secondary image becomes darker, and since the separation amount of the multiple image from the main image can be minimized, the multiple image becomes less conspicuous. Further, when the projection distance of the HUD image is increased, the HUD image approaches the focal distance during driving by the driver, so that the visibility of the HUD image is improved.

The first glass plate 11, the second glass plate 12, and the interlayer 13 will now be described in detail.

[Glass Plate]

The first glass plate 11 and the second glass plate 12 may be inorganic glass or organic glass. As the inorganic glass, for example, soda-lime glass, aluminosilicate glass, borosilicate glass, alkali-free glass, quartz glass, or the like may be used without particular limitation. The second glass plate 12 positioned outside the laminated glass 10 is preferably inorganic glass from the viewpoint of scratch resistance, and soda-lime glass from the viewpoint of moldability. When the first glass plate 11 and the second glass plate 12 are soda-lime glass, clear glass, green glass containing a predetermined amount or more of an iron component, and dark green glass can be suitably used.

The inorganic glass may be either non-tempered glass or tempered glass. The non-tempered glass is formed by molding molten glass into a flat plate shape and slowly cooling it. The tempered glass is formed by forming a compressive stress layer on the surface of the non-tempered glass. In the case of tempered glass, the residual stress Δσ can be reduced by isotropically distributing the stress.

The tempered glass may be either physically tempered glass such as air-cooled tempered glass or chemically tempered glass. In the case of physically tempered glass, the glass surface can be strengthened by generating a compressive stress layer on the glass surface due to the temperature difference between the glass surface and the glass interior by an operation other than slow cooling, such as rapid cooling of a glass plate heated uniformly in bending from a temperature near the softening point.

In the case of chemically tempered glass, the glass surface can be strengthened by generating compressive stress on the glass surface by an ion exchange method or the like, where, for example, the glass surface may be strengthened by generating compressive stress on the glass surface by an ion exchange method or the like after bending. Glass that absorbs ultraviolet rays or infrared rays may be used, and although transparent is preferable, a glass plate colored so as not to impair transparency may be used.

Additionally, the material of the organic glass includes polycarbonate, an acrylic resin such as polymethylmethacrylate, and a transparent resin such as polyvinyl chloride and polystyrene.

The first glass plate 11 and the second glass plate 12 are not limited to a trapezoidal shape or a rectangular shape, but may be formed into various shapes and curvatures. The first glass plate 11 and the second glass plate 12 may be bent by a gravity molding method, a press molding method, a roller molding method, or the like. The molding method of the first glass plate 11 and the second glass plate 12 is not particularly limited, and in the case of inorganic glass, for example, a glass plate formed by a float method or the like is preferable.

The thickness of the second glass plate 12 is preferably 1.1 mm to 3 mm at the thinnest portion. When the thickness of the second glass plate 12 is 1.1 mm or more, the strength such as flying-stone resistance is sufficient, and when it is 3 mm or less, the mass of the laminated glass 10 does not become too large, which is preferable from the viewpoint of fuel consumption of the vehicle. The thickness of the second glass plate 12 is more preferably 1.8 mm to 2.8 mm at the thinnest portion, more preferably 1.8 mm to 2.6 mm, more preferably 1.8 mm to 2.2 mm, and further preferably 1.8 mm to 2.1 mm.

The thickness of the first glass plate 11 is preferably 0.3 mm to 2.3 mm. When the thickness of the first glass plate 11 is 0.3 mm or more, the handling property is preferable, and when it is 2.3 mm or less, the mass does not become too large.

When the thickness of the first glass plate 11 is not appropriate, if two pieces of glass having particularly deep bends are formed as the first glass plate 11 and the second glass plate 12, a mismatch occurs between the shapes of the two pieces, which greatly affects the glass quality such as residual stress after crimping.

However, when the thickness of the first glass plate 11 is 0.3 mm to 2.3 mm, the glass quality such as residual stress can be maintained. When the thickness of the first glass plate 11 is 0.3 mm to 2.3 mm, it is particularly effective for maintaining the glass quality of glass having deep bends. The thickness of the first glass plate 11 is more preferably 0.5 mm to 2.2 mm, and further preferably 0.7 mm to 2.1 mm. In this range, the above effect becomes more remarkable.

The first glass plate 11 and/or 12 may be provided with a coating film having a water-repellent function, a function of cutting ultraviolet rays and infrared rays, or a coating film having low reflection characteristics and low radiation characteristics on the outside thereof. Further, a coating film having ultraviolet or infrared ray protection, low radiation characteristics, visible light absorption, coloring, or the like may be provided on the side of the first glass plate 11 and/or 12 in contact with the interlayer 13.

When the first glass plate 11 and the second glass plate 12 are made of inorganic glass having a curved shape, the first glass plate 11 and the second glass plate 12 are bent after being formed by a float method or the like and before being adhered by the interlayer 13. The bending is performed by softening the glass by heating. The heating temperature of the glass during the bending is preferably controlled in a range of approximately 550° C. to 700° C.

[Interlayer]

Thermoplastic resins are often used as the interlayer 13, and the thermoplastic resins conventionally used for this type of application are, for example, plasticized polyvinyl acetal resin, plasticized polyvinyl chloride resin, saturated polyester resin, plasticized saturated polyester resin, polyurethane resin, plasticized polyurethane resin, ethylene-vinyl acetate copolymer resin, ethylene-ethyl acrylate copolymer resin, cycloolefin polymer resin, and ionomer resin. A resin composition containing a modified block copolymer hydride disclosed in Japanese Patent No. 6065221 can also be suitably used.

Among these, a plasticized polyvinyl acetal resin is suitably used because of its excellent balance of various performances such as transparency, weather resistance, strength, adhesive strength, penetration resistance, impact energy absorption, moisture resistance, heat insulation, and sound insulation. These thermoplastic resins may be used alone or in combination of two or more kinds. The term “plasticized” in the above plasticized polyvinyl acetal resin means that it is plasticized by the addition of a plasticizer. The same applies to other plasticizing resins.

However, when a specific substance is sealed in the interlayer 13, it may be deteriorated by a specific plasticizer depending on the kind of the sealed substance. In this case, it is preferable to use a resin substantially free of the plasticizer. Examples of the resin free of the plasticizer include an ethylene-vinyl acetate copolymer (EVA) resin.

Examples of the polyvinyl acetal resin include a polyvinyl formal resin obtained by reacting polyvinyl alcohol (PVA) with formaldehyde, a polyvinyl acetal resin in a narrow sense obtained by reacting PVA with acetaldehyde, a polyvinyl butyral (PVB) resin obtained by reacting PVA with n-butyraldehyde, and the like. In particular, PVB is preferable because it is excellent in the balance of various performances such as transparency, weatherability, strength, adhesion, penetration resistance, shock energy absorption, moisture resistance, heat shielding, and sound insulation. These polyvinyl acetal resins may be used alone, or two or more kinds may be used in combination.

However, the material forming the interlayer 13 is not limited to a thermoplastic resin. In addition, the interlayer 13 may contain functional particles such as an infrared absorber, an ultraviolet absorber, or a luminous agent. The interlayer 13 may also have a colored portion called a shade band. The colored pigments used for forming the colored portion may be those which can be used for plastics, and the amount of f addition may be adjusted so that the visible light transmittance of the colored portion is 40% or less. Examples include organic colored pigments such as azo-based, phthalocyanine-based, quinacridone-based, perylene-based, perinone-based, dioxazine-based, anthraquinone-based, isoindolinon-based, and inorganic colored pigments such as oxides, hydroxides, sulfides, chromic acids, sulfates, carbonates, silicates, phosphates, arsenates, ferrocyanides, carbon, and metal powders. These colored pigments may be used alone, or two or more types may be used in combination.

The interlayer 13 may have a plurality of layers. For example, the interlayer 13 may have three or more layers. For example, if the interlayer is formed of three or more layers and the shear modulus of any of the layers except the layers on both sides is made smaller than the shear modulus of the layers on both sides by adjusting the plasticizer or the like, the sound insulation property of the laminated glass 10 can be improved. In this case, the shear modulus of the layers on both sides may be the same or different.

The thickness of the interlayer 13 is preferably 0.5 mm or more at the thinnest part. When the interlayer 13 has a plurality of layers, the thickness of the interlayer 13 is the total thickness of the layers. When the thickness of the thinnest part of the interlayer 13 is 0.5 mm or more, the impact resistance required for laminated glass is sufficient. The thickness of the interlayer 13 is preferably 3 mm or less at the thinnest part. When the maximum value of the thickness of the interlayer 13 is 3 mm or less, the mass of the laminated glass does not become too large. The maximum value of the thickness of the interlayer 13 is more preferably 2.8 mm or less, and further preferably 2.6 mm or less.

When the interlayer 13 has a plurality of layers, each layer included in the interlayer 13 is preferably formed of the same material, but may be formed of different materials. However, from the viewpoint of adhesiveness to the first glass plate 11 and the second glass plate 12 or a functional material to be inserted into the laminated glass 10, it is preferable to use the above material for 50% or more of the thickness of the interlayer 13.

In order to produce the interlayer 13, for example, the above resin material to be the interlayer is appropriately selected and extruded in a heated molten state using an extruder. The extrusion conditions such as the extrusion speed of the extruder are set to be uniform. Then, the extruded resin film is stretched, for example, as necessary, in order to give curvature to the upper and lower sides in accordance with the design of the laminated glass, thereby completing the interlayer 13.

[Laminated Glass]

The total thickness of the laminated glass 10 is preferably from 2.8 mm to 10 mm. If the total thickness of the laminated glass 10 is 2.8 mm or more, sufficient rigidity can be secured. If the total thickness of the laminated glass 10 is 10 mm or less, sufficient transmittance can be obtained and haze can be reduced.

The plate displacement between the first glass plate 11 and the second glass plate 12 on at least one side of the laminated glass 10 is preferably 1.5 mm or less, and more preferably 1 mm or less. Here, the plate displacement between the first glass plate 11 and the second glass plate 12 is, in other words, the amount of displacement between the outer peripheral lateral surface of the first glass plate 11 and the outer peripheral lateral surface of the second glass plate 12 in a plan view.

It is preferable the that plate displacement between the first glass plate 11 and the second glass plate 12 on at least one side of the laminated glass 10 is 1.5 mm or less in terms of not impairing the appearance. It is further preferable that the plate displacement between the first glass plate 11 and the second glass plate 12 on at least one side of the laminated glass 10 is 1.0 mm or less in terms of not impairing the appearance.

In order to manufacture the laminated glass 10, after a P-polarized light reflecting layer 15 is formed on the outer main surface 11*a* of the first glass plate 11, an interlayer 13 is located between the first glass plate 11 and the second glass plate 12 so that the P-polarized light reflecting layer 15 is on the outside to form a laminate. Then, for example, the laminate is placed in a rubber bag, a rubber chamber, a resin bag, or the like, and adhered in a vacuum controlled by a gauge pressure in the range of −100 kPa to −65 kPa at a temperature in the range of about 70° C. to 110° C. The heating conditions, the temperature conditions, and the lamination method are suitably selected.

Further, the laminated glass 10 with higher durability can be obtained by performing a bonding process of heating and pressurizing under controlled conditions of, for example, a temperature in the range of 100° C. to 150° C. and an absolute pressure in the range of 0.6 MPa to 1.5 MPa. However, in some cases, this heating and pressurizing process may not be used in consideration of the simplification of the process and the characteristics of the material enclosed in the laminated glass 10.

A method called "cold bend" in which one or both of the first glass plate 11 and the second glass plate 12 are joined together in an elastically deformed state may be used. The cold bend can be achieved by using a laminate consisting of the first glass plate 11, the interlayer 13, and the second glass plate 12 fixed by a temporary fixing means such as a tape, a conventionally known preliminary bonding device such as a nip roller, a rubber bag or a rubber chamber, and an autoclave.

In addition to the interlayer 13, a film or device having functions such as electric heating rays, infrared reflection, light emission, power generation, dimming, touch panel, visible light reflection, scattering, decoration, absorption, or the like may be provided between the first glass plate 11 and the second glass plate 12 to the extent that the effect of the present application is not impaired. Further, a film having functions such as anti-fogging, water repellency, heat shielding, and low reflection may be provided on the surface of the laminated glass 10. Further, a film having functions as heat shielding and heat generation may be provided on the inner main surface of the first glass plate 11 and the inner main surface of the second glass plate 12.

<Variation>

Figure 4A:
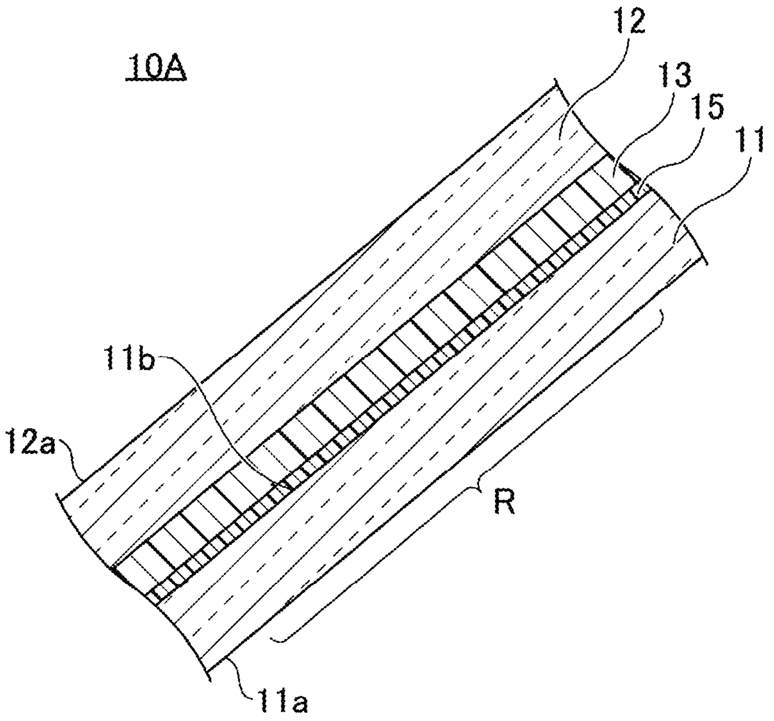
FIG. 4A is drawing illustrating a laminated glass according to a variation of a first embodiment.

In the laminated glass 10 shown in FIG. 2A and FIG. 2B, the P-polarized light reflecting layer 15 is provided on the outer main surface 11*a* of the first glass plate 11. However, the present invention is not limited thereto, and the P-polarized light reflecting layer 15 may be provided on the inner main surface 11*b* of the first glass plate 11 like the laminated glass 10 A shown in FIG. 4A. The P-polarized light reflecting layer 15 is, for example, a P-polarized light reflecting coating coated on the inner main surface 11*b* of the first glass plate 11. A P-polarized light reflecting film may be used as the P-polarized light reflecting layer 15 and attached to the inner main surface 11*b* of the first glass plate 11 via an adhesive layer.

Figure 4B:
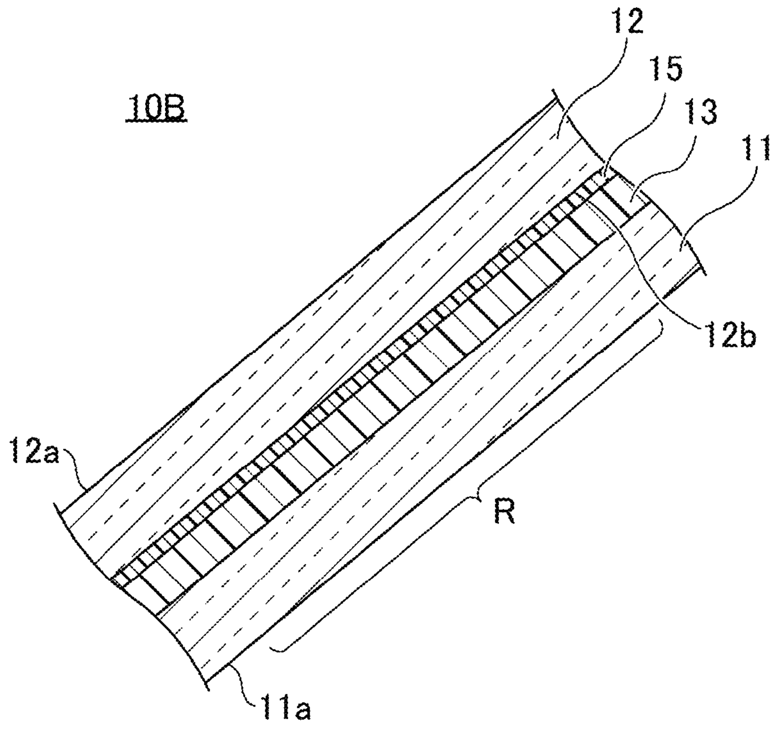
FIG. 4B is a drawing illustrating a laminated glass according to another variation of a first embodiment.

Alternatively, the P-polarized light reflecting layer 15 may be provided on the inner main surface 12*b* of the second glass plate 12 like the laminated glass 10B shown in FIG. 4B. The P-polarized light reflecting layer 15 is, for example, a P-polarized reflective coating coated on the inner main surface 12*b* of the second glass plate 12. A P-polarized light reflecting film may be used as the P-polarized light reflecting layer 15 and adhered to the inner main surface 12*b* of the second glass plate 12 via an adhesive layer.

In the case of the laminated glasses 10A and 10B, as in the case of the laminated glass 10, if the residual stress $\Delta\sigma$ in the target projection area satisfies the inequality of the simultaneous formulae (1), (2), and (3), the multiple image reflectance/main image reflectance can be made 10% or less, and the multiple image can be made inconspicuous. When the P-polarized light reflecting layer 15 is provided on the outer main surface 11*a* of the first glass plate 11 as in the case of the laminated glass 10, the main reflective surface becomes the surface of the P-polarized light reflecting layer 15 facing the first glass plate 11, and the multiple image is limited to one, which is preferable in that the multiple image can be made more inconspicuous.

EXAMPLES AND COMPARATIVE EXAMPLES

A laminated glass in which the first glass plate A and the second glass plate B are adhered to each other via an interlayer C and the entire outer main surface of the first glass plate A is coated with a P-polarized light reflecting layer ($TiZrO_2$ and $SiO_2$ stacked film with a thickness of 73.9 nm and 99.5 nm, respectively) was assumed. The first glass plate A, the second glass plate B, and the interlayer C were not wedge-shaped in cross-sectional view, and were assumed to have a constant thickness. Calculations were performed assuming that P-polarized light (wavelength 555 nm) was incident on the projected area of the laminated glass from the P-polarized light reflecting layer side at an incident angle of 57 deg. Specifically, in this laminated glass, when the first glass plate A and the second glass plate B are various combinations and a predetermined value is assumed as the residual stress $\Delta\sigma$, whether the multiple image reflectance/main image reflectance is 10% or less, that is, whether the formula (1) is satisfied, was determined by calculation. Such a calculation is generally performed when the optical performance of automotive glass is determined, and it is consistent with the actual numerical value.

First, the optical properties (refractive index and extinction coefficient) of the first glass plate A, the second glass plate B, and the interlayer C constituting the laminated glass were configured from the specifically assumed glass plate (green glass, dark green glass, clear glass) and the interlayer (clear interlayer).

Next, the visible light transmittance of the first glass plate A, the visible light transmittance of the second glass plate B, the visible light transmittance of the interlayer C, and the P-polarized light reflectance Rp, the S-polarized light transmittance Ts, and the S-polarized light reflectance Rs of the laminated glass were determined by calculation based on the optical theory from the optical properties (refractive index and extinction coefficient) of the first glass plate A, the second glass plate B, and the interlayer C obtained as described above and the plate thickness. The specific calculation method is shown, for example, in "Basic Theory of Optical Thin Films—Enlarged and Revised Edition—Kobiyama Mitsunobu (The Optronics Co., Ltd)".

Next, assuming a predetermined value as the residual stress $\Delta\sigma$, the phase difference $\delta$ was determined from the formula (3), and the polarization conversion factor X was determined from the formula (2) using the phase difference $\delta$. The multiple image reflectance=$((1-Rp)\times X\times Ts^2\times Rs)$ was determined using the polarization conversion factor X and the P-polarized light reflectance Rp, S-polarized light transmittance Ts, and S-polarized light reflectance Rs obtained as described above. Furthermore, the multiple image reflectance/main image reflectance were determined in consideration of the fact that the main image reflectance=the P-polarized light reflectance Rp.

Examples and comparative examples will be described below, but the present invention is not limited to these examples. Example 1 and examples 3 to 9 are examples, and example 2 is a comparative example.

Example 1

Assuming green glass having a thickness of 1.8 mm as the first glass plate A, green glass having a thickness of 1.8 mm as the second glass plate B, and a clear interlayer having a thickness of 0.76 mm as the interlayer C, and assuming a residual stress $\Delta\sigma$ value of 0.9 MPa, the multiple image reflectance/main image reflectance were calculated.

Example 2

Assuming green glass having a thickness of 1.8 mm as the first glass plate A, green glass having a thickness of 1.8 mm as the second glass plate B, and a clear interlayer having a thickness of 0.76 mm as the interlayer C, and assuming a residual stress $\Delta\sigma$ value of 1.3 MPa, the multiple image reflectance/main image reflectance were calculated.

Example 3

Assuming a 1.8 mm thick dark green glass as the first glass plate A, a 1.8 mm thick dark green glass as the second glass plate B, and a 0.76 mm thick clear interlayer as the interlayer C, and assuming a residual stress $\Delta\sigma$ value of 0.9 MPa, the multiple image reflectance/main image reflectance were calculated.

Example 4

Assuming a 1.8 mm thick green glass as the first glass plate A, a 1.8 mm thick dark green glass as the second glass plate B, and a 0.76 mm thick clear interlayer as the interlayer C, and assuming a residual stress $\Delta\sigma$ value of 0.9 MPa, the multiple image reflectance/main image reflectance were calculated.

Example 5

Assuming a 1.8 mm thick clear glass as the first glass plate A, a 1.8 mm thick green glass as the second glass plate B, and a 0.76 mm thick clear interlayer as the interlayer C, and assuming a residual stress $\Delta\sigma$ value of 1 MPa, the multiple image reflectance/main image reflectance were calculated.

Example 6

Assuming clear glass having a thickness of 1.8 mm as the first glass plate A, dark green glass having a thickness of 1.8 mm as the second glass plate B, and a clear interlayer having a thickness of 0.76 mm as the interlayer C, and assuming a residual stress $\Delta\sigma$ value of 1 MPa, the multiple image reflectance/main image reflectance were calculated.

Example 7

Assuming clear glass having a thickness of 1.8 mm as the first glass plate A, dark green glass having a thickness of 1.8 mm as the second glass plate B, and a clear interlayer having a thickness of 0.76 mm as the interlayer C, and assuming a residual stress $\Delta\sigma$ value of 0.6 the MP a, multiple image reflectance/main image reflectance were calculated.

Example 8

Assuming clear glass having a thickness of 1.6 mm as the first glass plate A, dark green glass having a thickness of 1.8 mm as the second glass plate B, and a clear interlayer having a thickness of 0.76 mm as the interlayer C, and assuming a residual stress $\Delta\sigma$ value of MPa, multiple 0.9 the image reflectance/main image reflectance were calculated.

Example 9

Assuming clear glass with a thickness of 2 mm as the first glass plate A, dark green glass with a thickness of 2 mm as the second glass plate B, and a clear interlayer with a thickness of 0.76 mm as the interlayer C, and assuming a residual stress $\Delta\sigma$ value of 1 MPa, the multiple image reflectance/main image reflectance were calculated.

The calculation results of examples 1 to 9 are shown in FIG. 5. In FIG. 5, ◎ represents a case when the multiple image reflectance/main image reflectance ($\theta$=57 deg) is 5% or less, ○ represents a case when it is greater than 5% and 10% or less, and x represents a case when it is greater than 10%. That is, x represents the case when the multiple image reflectance/main image reflectance does not satisfy formula (1), ○ represents the case when the multiple image reflectance/main image reflectance satisfies formula (1), and ◎ represents the case when the multiple image reflectance/main image reflectance satisfies formula (1) with a margin.

As shown in example 1 and examples 3 to 9 in FIG. 5, when the residual stress $\Delta\sigma$ is assumed to be 1 MPa or less, it is found that the multiple image reflectance/main image reflectance (0=57 deg) can be 10% or less. The results of Example 1 and Examples 3 to 9 show that if the residual stress $\Delta\sigma$ is adjusted to 1 MPa or less by slow cooling time or the like in the manufacturing process of laminated glass, the multiple image reflectance/main image reflectance can be 10% or less by using the first glass plate A and the second glass plate B that satisfy the requirements shown in Example 1 and Examples 3 to 9 in FIG. 5. That is, if the residual stress $\Delta\sigma$ is adjusted to 1 MPa or less by using the first glass plate A and the second glass plate B that satisfy the requirements shown in example 1 and examples 3 to 9 in FIG. 5 and by making the slow cooling time longer than the conventional method or the like, it is possible to achieve the laminated glass with the less conspicuous multiple image.

Conversely, in example 2, even if the same first glass plate A and the second glass plate B as in example 1 are used, assuming a value of 1.3 MPa as the residual stress $\Delta\sigma$, the multiple image reflectance/main image reflectance cannot be set to 10% or less. That is, if the residual stress $\Delta\sigma$ exceeds 1 MPa due to a short slow cooling time or the like, the multiple image reflectance/main image reflectance cannot be set to 10% or less, so that the multiple image is conspicuous.

When the visible light transmittance of the first glass plate A and the second glass plate B is low, as in example 3, heat is easily absorbed when the glass plate is formed, and residual stress is likely to occur. However, if the residual stress $\Delta\sigma$ is adjusted to 1 MPa or less by a slow cooling time or the like, it is possible to achieve laminated glass with a less conspicuous multiple image.

If there is a difference in the visible light transmittance of the first glass plate A and the second glass plate B, as in examples 4 to 6, there is a difference in the slow cooling time when the glass plate is formed, and residual stress is likely to occur. However, if the residual stress $\Delta\sigma$ is adjusted to 1 MPa or less by a slow cooling time or the like, it is possible to achieve laminated glass with a less conspicuous multiple image.

If there is a difference in the thickness of the first glass plate A and the second glass plate B, as in example 8, there is a difference in the slow cooling time when the glass plate is formed, and residual stress is likely to occur. However, if the residual stress $\Delta\sigma$ is adjusted to 1 MPa or less by a slow cooling time or the like, it is possible to achieve the laminated glass with a less conspicuous multiple image.

Further, if the thickness of the first glass plate A and the second glass plate B is thick, as in Example 9, heat is easily absorbed when the glass plate is formed and residual stress is easily generated. However, if the residual stress $\Delta\sigma$ is adjusted to 1 MPa or less by a slow cooling time or the like, it is possible to achieve the laminated glass with a less conspicuous multiple image.

Further, the present invention is not limited to these embodiments, but various variations and modifications may be made without departing from the scope of the present invention.

In addition to the above-described embodiments, the following additional notes are disclosed.

(Additional Note 1)

A laminated glass including a first glass plate; a second glass plate; and an interlayer which is positioned between the first glass plate and the second glass plate and adheres to the first glass plate and the second glass plate,

- wherein a target projection area for use in a head-up display and on which P-polarized light can be incident from a direction of the first glass plate is defined in a part of the laminated glass, and a P-polarized light reflecting layer is provided in the target projection area,
- wherein a residual stress $\Delta\sigma$ [MPa] in the target projection area satisfies an inequality by simultaneously satisfying following formulae (1), (2), and (3) with variables Rp, Ts, and t.

$$((1-Rp)\times X\times Ts^2\times Rs)/Rp\leq 0.1 \tag{1}$$

$$X=\sin\delta \tag{2}$$

$$\Delta\sigma=\delta/2\pi\times(\lambda/C)/t \tag{3}$$

In a case where the P-polarized light is incident on the target projection area of the laminated glass from the direction of the first glass plate at an incident angle of 57 deg, a P-polarized light reflectance of the laminated glass is referred to as Rp, a P-polarized light transmittance is referred to as (1-Rp), a polarization conversion factor of the first glass plate and the second glass plate is referred to as X, an S-polarized light transmittance of the laminated glass is referred to as Ts, an S-polarized light reflectance of an outer main surface of the second glass plate is referred to as Rs, and a phase difference occurring inside the first glass plate and the second glass plate is referred to as $\delta$; $\pi$ is a circular constant, a wavelength $\lambda$ of the P-polarized light is 555 [nm], a photoelastic coefficient C is configured as 2.8 [(nm/mm)/MPa], and a total thickness of the first glass plate and the second glass plate is referred to as t [mm].

(Additional Note 2)

The laminated glass according to additional note 1, wherein the residual stress $\Delta\sigma$ is 1 MPa or less.

(Additional Note 3)

The laminated glass according to additional note 1 or 2, wherein the residual stress $\Delta\sigma$ is 0.7 MPa or less.

(Additional Note 4)

The laminated glass according to any one of additional notes 1 to 3, wherein the P-polarized light reflectance Rp is 10% or more and 25% or less.

(Additional Note 5)

The laminated glass according to any one of additional notes 1 to 4, wherein the P-polarized light reflecting layer is provided on the outer main surface of the first glass plate.

(Additional Note 6)

The laminated glass according to any one of additional notes 1 to 5, wherein the S-polarized light transmittance Ts of the laminated glass at the incident angle of 57 deg to the target projection area is 80% or less.

(Additional Note 7)

The laminated glass according to any one of additional notes 1 to 6, wherein a visible light transmittance of the first glass plate is greater than that of the second glass plate.

(Additional Note 8)

The laminated glass according to any one of additional notes 1 to 7, wherein the total thickness of the target projection area is 4.6 mm or less.

(Additional Note 9)

The laminated glass according to any one of additional notes 1 to 8, wherein the thickness of the first glass plate in the target projection area is 1.8 mm or less.

(Additional Note 10)

The laminated glass according to any one of additional notes 1 to 9, wherein the S-polarized light transmittance Ts of the laminated glass at the incident angle of 57 deg to the target projection area is 75% or less.

(Additional Note 11)

The laminated glass according to any one of additional notes 1 to 10, wherein a thickness of the second glass plate in the target projection area is 1.9 mm or more.

(Additional Note 12)

The laminated glass according to any one of additional notes 1 to 11, wherein the visible light transmittance of either the first glass plate or the second glass plate in the target projection area is 87% or less.

(Additional Note 13)

The laminated glass according to any one of additional notes 1 to 12, wherein a difference in the visible light transmittance between the first glass plate and the second glass plate in the target projection area is 3% or more.

(Additional Note 14)

The laminated glass according to any one of additional notes 1 to 13, wherein a difference in thickness between the first glass plate and the second glass plate in the target projection area is 0.1 mm or more.

(Additional Note 15)

The laminated glass according to any one of additional notes 1 to 14, wherein a visible light transmittance of the interlayer in the target projection area is 90% or more.

(Additional Note 16)

The laminated glass according to any one of additional notes 1 to 15, wherein the laminated glass has a shielding layer and a HUD display area for use in the head-up display, that is at least 20 mm away from an edge of the shielding layer.

The present application is a continuation application of International Application $N_0$. PCT/JP2023/012375, filed on Mar. 28, 2023 which claims priority to Japanese Patent Application $N_0$. 2022-055748, filed on Mar. 30, 2022 with the Japanese Patent Office and the entire contents of No. 2022-055748 are hereby incorporated by reference.

What is claimed is:

1. A laminated glass comprising: a first glass plate; a second glass plate; and an interlayer which is positioned between the first glass plate and the second glass plate and adheres to the first glass plate and the second glass plate, wherein a target projection area for use in a head-up display and on which P-polarized light can be incident from a direction of the first glass plate is defined in a part of the laminated glass, and a P-polarized light reflecting layer is provided in the target projection area, wherein a residual stress Δσ [MPa] in the target projection area satisfies an inequality by simultaneously satisfying following formulae (1), (2), and (3) with variables Rp, Ts, and t, $$((1-Rp)\times X\times Ts^2\times Rs)/Rp\leq 0.1 \quad (1)$$

$$X=\sin\delta \quad (2)$$

$$\Delta\sigma=\delta/2\pi\times(\lambda/C)/t \quad (3)$$

wherein in a case where the P-polarized light is incident on the target projection area of the laminated glass from the direction of the first glass plate at an incident angle of 57 deg, a P-polarized light reflectance of the laminated glass is referred to as Rp, a P-polarized light transmittance is referred to as (1−Rp), a polarization conversion factor of the first glass plate and the second glass plate is referred to as X, an S-polarized light transmittance of the laminated glass is referred to as Ts, an S-polarized light reflectance of an outer main surface of the second glass plate is referred to as Rs, and a phase difference occurring inside the first glass plate and the second glass plate is referred to as δ; π is a circular constant, a wavelength λ of the P-polarized light is 555 [nm], a photoelastic coefficient C is configured as 2.8 [(nm/mm)/MPa], and a total thickness of the first glass plate and the second glass plate is referred to as t [mm].

2. The laminated glass according to claim 1, wherein the residual stress Δσ is 1 MPa or less.

3. The laminated glass according to claim 1, wherein the residual stress Δσ is 0.7 MPa or less.

4. The laminated glass according to claim 1, wherein the P-polarized light reflectance Rp is 10% or more and 25% or less.

5. The laminated glass according to claim 1, wherein the P-polarized light reflecting layer is provided on the outer main surface of the first glass plate.

6. The laminated glass according to claim 1, wherein the S-polarized light transmittance Ts of the laminated glass at the incident angle of 57 deg to the target projection area is 80% or less.

7. The laminated glass according to claim 1, wherein a visible light transmittance of the first glass plate is greater than that of the second glass plate.

8. The laminated glass according to claim 1, wherein the total thickness of the target projection area is 4.6 mm or less.

9. The laminated glass according to claim 1, wherein a thickness of the first glass plate in the target projection area is 1.8 mm or less.

10. The laminated glass according to claim 1, wherein the S-polarized light transmittance Ts of the laminated glass at the incident angle of 57 deg to the target projection area is 75% or less.

11. The laminated glass according to claim 1, wherein a thickness of the second glass plate in the target projection area is 1.9 mm or more.

12. The laminated glass according to claim 1, wherein a visible light transmittance of either the first glass plate or the second glass plate in the target projection area is 87% or less.

13. The laminated glass according to claim 1, wherein a difference in a visible light transmittance between the first glass plate and the second glass plate in the target projection area is 3% or more.

14. The laminated glass according to claim 1, wherein a difference in thickness between the first glass plate and the second glass plate in the target projection area is 0.1 mm or more.

15. The laminated glass according to claim 1, wherein a visible light transmittance of the interlayer in the target projection area is 90% or more.

16. The laminated glass according to claim 1, wherein the laminated glass has a shielding layer and a HUD display area that is at least 20 mm away from an edge of the shielding layer, the HUD display area being for use in the head-up display.

* * * * *